W. H. DAILY.
WAVE MOTOR.
APPLICATION FILED APR. 21, 1908.
930,536.
Patented Aug. 10, 1909.
2 SHEETS—SHEET 1.
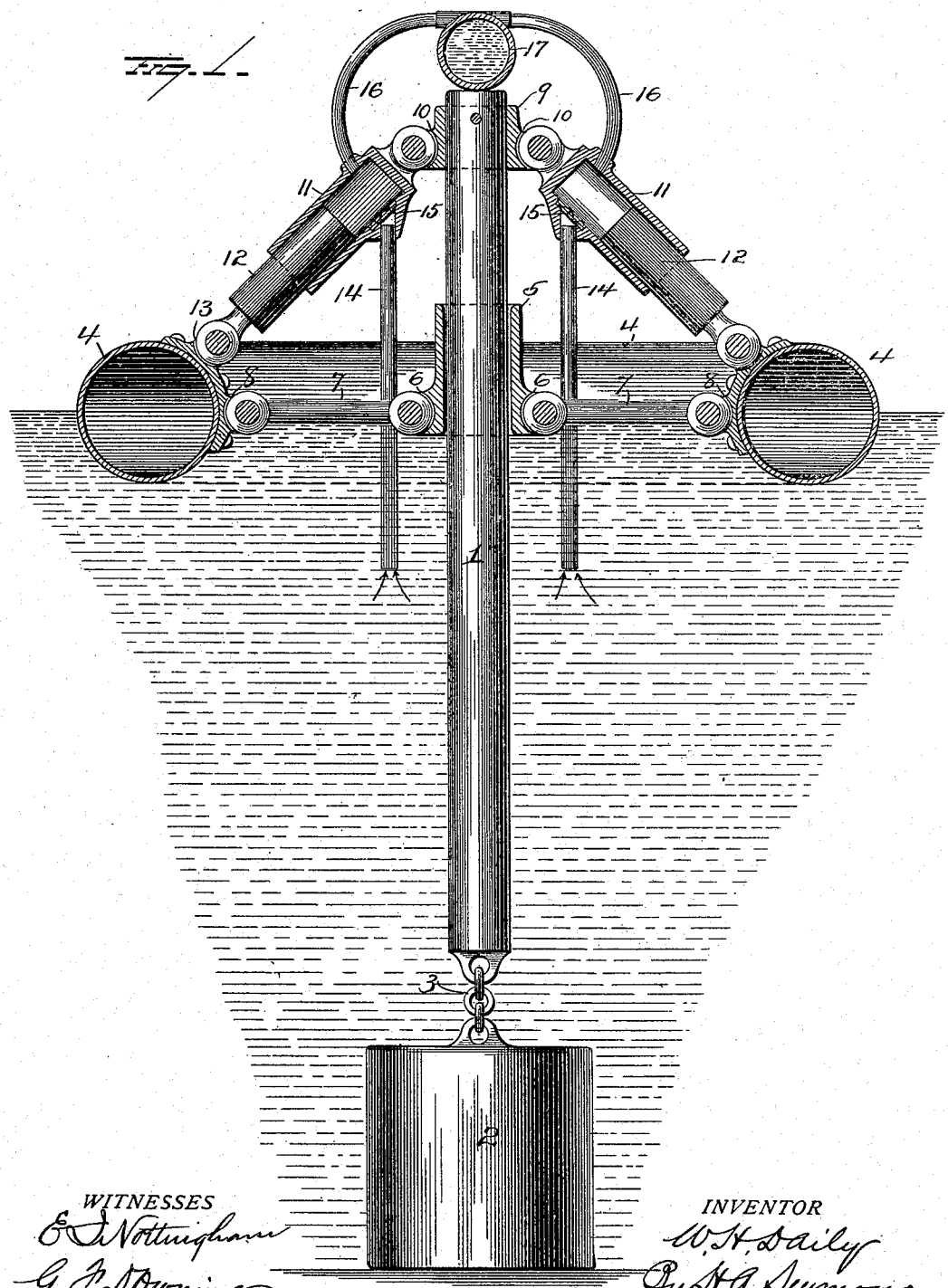
WITNESSES
INVENTOR

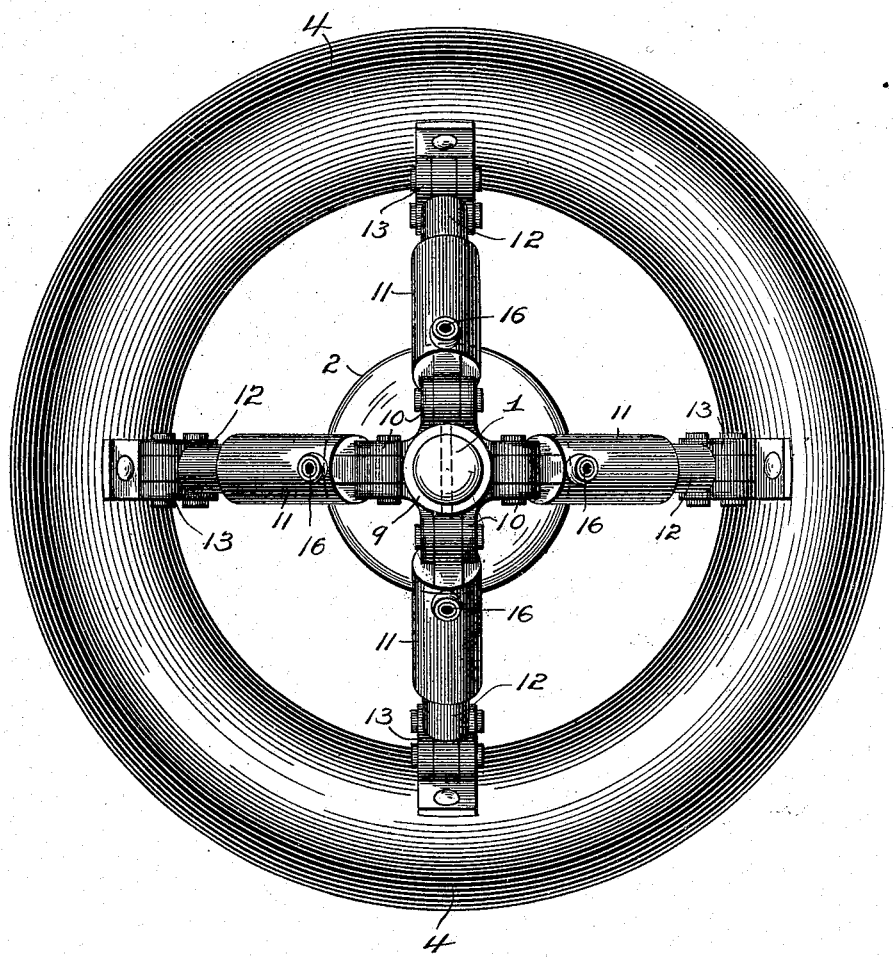

UNITED STATES PATENT OFFICE.

WILLIAM HENRY DAILY, OF TUCSON, ARIZONA TERRITORY.

WAVE-MOTOR.

No. 930,536.     Specification of Letters Patent.     Patented Aug. 10, 1909.

Application filed April 21, 1908. Serial No. 428,387.

*To all whom it may concern:*

Be it known that I, WILLIAM H. DAILY, of Tucson, in the county of Pima and Territory of Arizona, have invented certain new and useful Improvements in Wave-Motors; and I do hereby declare the following to be a full, clear, and exact description of the invention, such as will enable others skilled in the art to which it appertains to make and use the same.

My invention relates to improvements in wave motors,—the object of the invention being to so construct a motor of this character that it shall be simple; comprise few parts, and so that all wave movements will be utilized in the operation of the device.

With this object in view the invention consists in certain novel features of construction and combinations of parts as hereinafter set forth and pointed out in the claims.

In the accompanying drawing, Figure 1 is a view partly in section and partly in elevation illustrating my improvements, and Fig. 2 is a plan view.

1 represents a standard or column, the major portion of which is held submerged by means of a suitable anchor 2 which is connected with the lower end of said standard or column by means of links 3.

An annular float 4 encircles the standard 1 and is of considerably greater diameter than the latter. A sleeve 5 is mounted loosely on the standard and provided with a series of lugs 6 to which the inner ends of a series of radial arms 7 are pivotally connected. The outer ends of the arms 7 are pivoted to lugs 8 secured to the inner face of the float 4.

A collar 9 is secured to the standard 1, near the upper end thereof, and is provided with a series of perforated lugs 10, to which cylinders 11 are pivotally connected. A piston 12 has a reciprocating motion in each cylinder 11 and the pistons 12 are pivotally connected with lugs 13 secured to the float.

To the upper portion of each cylinder 11, a pipe 14 is connected, the lower end of each pipe 14 terminating under the surface of the water beneath the float 4 so that when the float moves in a direction tending to withdraw one or more of the pistons 12, water will be caused to flow upwardly through one or more of the pipes 14 and enter the cylinder or cylinders with which the same may be connected. In order to prevent a backward flow of water through the pipes 14 when the pumps (comprising the cylinders 11 and pistons 12) are operated to force water from the cylinders, check valves 15 are located in the pipes 14 where they communicate with the cylinders 11. Each cylinder 11 communicates, by means of a pipe 16, with a main 17,—through which latter the water may be conducted to suitable machinery where it may be utilized for generating power or for any other purpose desired.

From the construction and arrangement of parts above described it will be seen that when the float 4 is caused by a wave motion, to descend bodily, the pistons in all of the cylinders will also descend and thus cause water to be drawn through the pipes 14 into the several cylinders. Should a succeeding wave motion cause the float to move bodily upward (such movement being permitted by the loose sleeve 5 on the standard 1), the water in the several cylinders will be forced therefrom by the upward movements of the pistons 12 and caused to flow through the pipes 16 to the main 17, by which latter it will be conducted to the place where it is to be utilized.

It is apparent that on account of the pivotal connections between the float 4 and the sleeve 5, a wave may tilt said float and may in fact cause the float to vibrate. The effect of such motion of the float will be to cause water to be drawn in one or more of the cylinders and forced from the opposite cylinders so that all of the pumps would be in operation,—some of them receiving water and the others forcing water to the main.

By means of the construction herein set forth, it will be readily seen that every wave motion, regardless of its character, direction or length will be utilized in operating my improved motor.

Various changes might be made in the details of construction of my invention without departing from the spirit thereof or limiting its scope and hence I do not desire to restrict myself to the precise details herein set forth.

Having fully described my invention what I claim as new and desire to secure by Letters-Patent, is,—

1. In a wave motor, the combination of a standard, a float, pump cylinders and pistons interposed between the standard and float and operative by the movements of the latter, a part movable on the standard, and connections between said movable part and the float.

2. In a wave motor, the combination with a standard and pump cylinders attached to the upper portion thereof, of a float, a sleeve mounted loosely on the standard, arms pivotally connected at their respective ends to the float and said sleeve, and pump pistons connected with the float and entering said pump cylinders.

3. In a wave motor, the combination with a standard, of a series of pump cylinders attached to the upper portion thereof, a water main communicating with said cylinders, a float encircling the standard, a sleeve loose on the standard, arms pivoted to said sleeve and to the float, pistons attached to the float and entering said cylinders and pipes communicating with said cylinders and terminating below the float.

In testimony whereof, I have signed this specification in the presence of two subscribing witnesses.

WILLIAM HENRY DAILY.

Witnesses:
FRANCIS M. HARTMAN,
J. W. WHEDON, Jr.